(12) United States Patent
Liu et al.

(10) Patent No.: US 11,712,859 B2
(45) Date of Patent: Aug. 1, 2023

(54) LIGHT-WEIGHT FLEXIBLE HIGH-THERMAL-CONDUCTIVITY NANO-CARBON COMPOSITE FILM AND METHOD FOR PREPARING SAME

(71) Applicant: SHANGHAI COMPOSITES SCIENCE & TECHNOLOGY CO., LTD, ShangHai (CN)

(72) Inventors: Qianli Liu, ShangHai (SH); Feng Shen, ShangHai (CN); Chun Zhuang, ShangHai (CN); Xiaolei Wang, ShangHai (SH); Jiang Pan, ShangHai (CN); Xufeng Hao, ShangHai (CN); Jie Tian, ShangHai (CN)

(73) Assignee: SHANGHAI COMPOSITES SCIENCE & TECHNOLOGY CO., LTD, ShangHai (CN)

( * ) Notice: Subject to any disclaimer, the term of this patent is extended or adjusted under 35 U.S.C. 154(b) by 1050 days.

(21) Appl. No.: 16/319,201

(22) PCT Filed: May 3, 2017

(86) PCT No.: PCT/CN2017/082827
§ 371 (c)(1),
(2) Date: Jan. 18, 2019

(87) PCT Pub. No.: WO2018/040606
PCT Pub. Date: Mar. 8, 2018

(65) Prior Publication Data
US 2021/0086477 A1    Mar. 25, 2021

(30) Foreign Application Priority Data
Aug. 29, 2016    (CN) .......................... 201610757514.0

(51) Int. Cl.
*B29C 70/44*    (2006.01)
*B32B 7/12*    (2006.01)
(Continued)

(52) U.S. Cl.
CPC ............ *B29C 70/44* (2013.01); *B29C 70/003* (2021.05); *B32B 7/12* (2013.01); *B32B 9/045* (2013.01);
(Continued)

(58) Field of Classification Search
CPC ....... B29C 51/00; B29C 70/088; B29C 70/44; B29C 70/685; B29C 70/86;
(Continued)

(56) References Cited

U.S. PATENT DOCUMENTS 9,994,741 B2 * 6/2018 Hedrick ................... H01L 24/13
2012/0289112 A1* 11/2012 Mao ....................... B82Y 30/00
442/72

(Continued)

FOREIGN PATENT DOCUMENTS

CN    101868069 A    10/2010
CN    103963403 A    8/2014
(Continued)

OTHER PUBLICATIONS

First Office Action for Chinese patent application 201610757514.0.
(Continued)

*Primary Examiner* — Sonya M Sengupta
(74) *Attorney, Agent, or Firm* — Bayramoglu Law Offices LLC

(57) ABSTRACT

The present disclosure provides a light-weight flexible high-thermal-conductivity nano-carbon composite film and a method for preparing same. The nano-carbon composite film includes a plurality of composite units laminated sequentially. The composite unit includes flexible adhesive layers (Continued)

and a graphene film layer, and the flexible adhesive layers are disposed on both sides of the graphene film layer. The preparation method includes sequentially laminating the composite units and hot pressing to obtain the nano-carbon composite film. The nano-carbon composite film has the characteristics of high thermal conductivity, light weight and flexibility, and has an in-plane thermal conductivity of up to 500 W/m·K or higher, a density of 2.0 g/cm$^3$ or less, and still a thermal conductivity of 500 W/m·K or higher after the nano-carbon composite film is repeatedly bent by 180° for 50 times while there is no peeling of graphene from the surface.

9 Claims, 1 Drawing Sheet

(51) Int. Cl.
  B32B 9/04 (2006.01)
  B32B 33/00 (2006.01)
  B32B 37/06 (2006.01)
  B32B 37/10 (2006.01)
  B29C 70/00 (2006.01)
(52) U.S. Cl.
  CPC .............. *B32B 33/00* (2013.01); *B32B 37/06* (2013.01); *B32B 37/10* (2013.01); *B32B 2307/302* (2013.01); *B32B 2307/732* (2013.01)
(58) Field of Classification Search
  CPC .......... B29K 2105/167; B29K 2307/04; B82Y 30/00; B82Y 40/00; B32B 2307/302; B32B 2307/732; B32B 2605/00; B32B 33/00; B32B 37/06; B32B 37/10; B32B 7/12; B32B 9/007; B32B 9/04; B32B 9/045

See application file for complete search history.

(56) References Cited

U.S. PATENT DOCUMENTS

| | | | | |
|---|---|---|---|---|
| 2012/0298619 | A1* | 11/2012 | Jiang | ....................... B82Y 40/00 977/847 |
| 2017/0166784 | A1* | 6/2017 | Hedrick | .............. H01L 25/0657 |
| 2017/0213998 | A1* | 7/2017 | Feng | .......................... B32B 9/04 |
| 2017/0338312 | A1* | 11/2017 | Treossi | ................... B32B 9/007 |
| 2019/0378781 | A1* | 12/2019 | Hedrick | .................. H01L 24/92 |

FOREIGN PATENT DOCUMENTS

| | | |
|---|---|---|
| CN | 104810336 A | 7/2015 |
| CN | 104924701 A | 9/2015 |
| CN | 105514065 A | 4/2016 |
| CN | 106378984 A | 2/2017 |
| KR | 20140015927 A | 2/2014 |

OTHER PUBLICATIONS

Second Office Action for Chinese patent application 201610757514.0.

Written Opinion of the International Search Authority from corresponding PCT/CN2017/082827.

International Search Report from corresponding PCT/CN2017/082827.

First search report for Chinese patent application 201610757514.0.

* cited by examiner

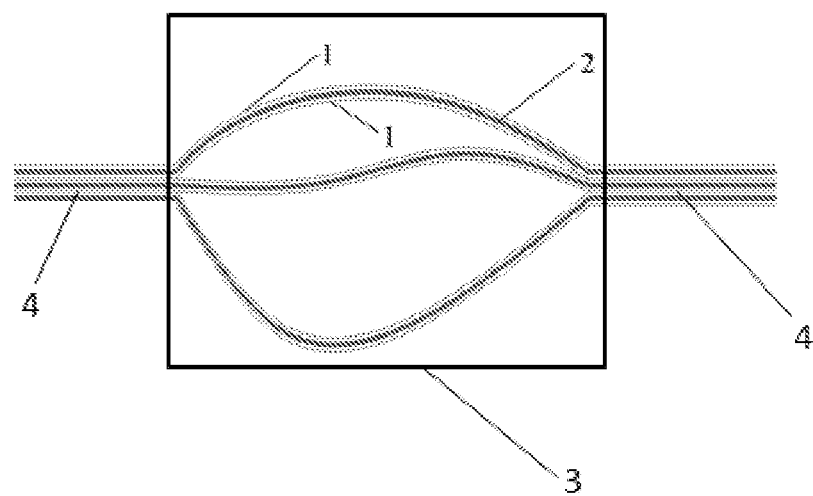

LIGHT-WEIGHT FLEXIBLE HIGH-THERMAL-CONDUCTIVITY NANO-CARBON COMPOSITE FILM AND METHOD FOR PREPARING SAME

CROSS-REFERENCE TO RELATED APPLICATIONS

This application is a national stage application of PCT Application No. PCT/CN2017/082827. This Application claims priority from PCT Application No. PCT/CN2017/082827, filed May 3, 2017, and CN Application No. 201610757514.0, filed Aug. 29, 2016, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

BACKGROUND

Technical Field

The present disclosure relates to a method for preparing a nano-carbon composite film, and in particular to a light-weight flexible high-thermal-conductivity nano-carbon composite film and a method for preparing same.

Related Art

With the development of electronic systems to high integration, high speed and high power, the issue of thermal energy management has become increasingly prominent. Light-weight high-thermal-conductivity materials are the key to solving this problem, and there is an urgent need for the development of such materials in the areas of national defense and national economy. For example, in the field of space science and technologies, satellite communication technology, space exploration, earth observation and other technologies have developed rapidly since the mid-1960s, which raise increasingly higher requirements for the resolution and accuracy of satellites. For a high-resolution and high-precision satellite, even a small thermal deformation can have a huge impact on the performance of the entire satellite. However, with the development of a new generation of satellites, the power of satellite-borne instruments and electronic components greatly increases, and lots of heat is generated during the transmission of electrical energy. Meanwhile, the satellites are exposed to a severe thermal environment where high and low temperatures alternate, imposing even higher requirements on thermal control materials. Therefore, faster, more stable, lighter, and more flexible thermally conductive materials are needed to ensure uniform heat distribution while no additional stress is generated, so as to maintain the dimensional stability of the satellite payload, thereby realizing the attitude stability of satellites and the high pointing accuracy of satellite-borne instruments.

In recent years, the development of new carbon materials provides a new direction of development for light-weight flexible high-thermal-conductivity materials. In theory, the thermal conductivity of defect-free monolayer graphite along a crystal face (002) can reach 4180 W/m·K, and the measured value can reach 2000 W/m·K. Meanwhile, because of the good mechanical properties, low coefficient of expansion, low density, resistance to high and low temperatures, corrosion resistance and good electrical conductivity, the graphene has attracted extensive attention. The macroscopic graphene film material formed therewith shows excellent thermal conductivity, and thus becomes a new focus in the research and application of thermally conductive materials. However, the graphene film has poor flexibility, is easy to peel off during use, and is difficult to bend when the graphene film has a large thickness. Therefore, it has limited practical use. In recent years, the flexibility of the graphene film is improved by introducing a polymer between graphene sheets. However, this has difficulty in solving the problem of easily peeling off of the graphite sheet. In addition, the problem of peeling off is also solved by coating a resin on the surface of the graphene film, but the adhesion of the resin to the graphene film is poor. Therefore, there is an urgent need for a technology for preparing a light-weight flexible high-thermal-conductivity film.

SUMMARY

In view of the defects in the prior art, the present disclosure provides a light-weight flexible high-thermal-conductivity nano-carbon composite film and a method for preparing same.

The object of the present disclosure is achieved by the following technical solutions:

The present disclosure provides a light-weight flexible high-thermal-conductivity nano-carbon composite film, which includes a plurality of composite units laminated sequentially, where the composite unit includes flexible adhesive layers and a graphene film layer, and the flexible adhesive layers are disposed on both sides of the graphene film layer.

Preferably, the graphene film layer consists of 1-5 layers of graphene, and the thickness of the graphene film layer is 1-100 μm.

Preferably, the thickness of the flexible adhesive layer is 0.5-4 μm.

Preferably, the flexible adhesive layer includes at least one of a carbon nanotube film/resin prepreg and a carbon nanotube/resin slurry.

Preferably, the resin includes one of epoxy resins, bismaleimide resins, phenolic resins, polyimides, polyethylene, polyvinyl alcohols, polyesters, polypropylene, polystyrene and polyurethane or a mixture of more than one thereof.

Preferably, the content of the resin in the carbon nanotube film/resin prepreg is 20-40 wt %.

Preferably, the content of the carbon nanotubes in the carbon nanotube/resin slurry is 0.02-5 wt %.

Preferably, the carbon nanotube film includes tens to hundreds of layers of 100 nm-thick carbon nanotube film units, and the carbon nanotubes in the carbon nanotube film units intersect with one another to form a network structure.

Preferably, the nano-carbon composite film is provided with a rigid section and a flexible section; and the composite units in the rigid section are closely attached to one another, and a gap exists between the composite units in the flexible section.

The present disclosure further provides a method for preparing a light-weight flexible high-thermal-conductivity nano-carbon composite film, which includes the following steps:

preparing flexible adhesive layers, and laminating or coating the flexible adhesive layers on both sides of a graphene film layer to form a composite unit;

sequentially laminating the composite units, and inserting a polytetrafluoroethylene film between flexible sections of every two composite units for isolation; and heating and press forming the laminated composite units in a vacuum bag, and removing the polytetrafluoroethylene film after press forming, to obtain the nano-carbon composite film.

Preferably, the thickness of the polytetrafluoroethylene film is 10-30 μm.

Preferably, when the flexible adhesive layer is a carbon nanotube film/resin prepreg, the preparation method of the flexible adhesive layer includes the following steps:

dissolving a resin in a solvent to prepare a concentration of a resin solution, impregnating a carbon nanotube film in the resin solution for 30-60 minutes, taking out the carbon nanotube film, and drying to obtain the carbon nanotube film/resin prepreg.

More preferably, the carbon nanotube film is prepared by floating catalyst-based chemical vapor deposition.

More preferably, the solvent is one of ethanol, acetone, benzene, toluene, tetrahydrofuran, dimethylformamide, methylpyrrolidone and dimethyl sulfoxide, or a mixture of two or more thereof.

More preferably, the drying temperature is lower than the gelation temperature (in case of a thermosetting resin) or the thermal decomposition temperature (in case of a thermoplastic resin) of the resin. In order to increase the volatilization rate of the solvent in the resin solution, the impregnated carbon nanotube film can be placed in a vacuum oven.

Preferably, when the flexible adhesive layer is a carbon nanotube/resin slurry, the preparation method of the flexible adhesive layer includes the following steps:

mixing carbon nanotubes with a resin, stirring to form a mixed solution, dispersing to obtain a carbon nanotube dispersion, and diluting the carbon nanotube dispersion with a solvent to obtain the carbon nanotube/resin slurry.

More preferably, the dispersing includes one or more of ultrasonic vibration, ultrasonic disruption and three-roll grinding.

More preferably, the solvent is one of ethanol, acetone, benzene, toluene, tetrahydrofuran, dimethylformamide, methylpyrrolidone and dimethyl sulfoxide or a mixture of two or more thereof.

The nano-carbon composite film prepared according to the present disclosure has the characteristics of high thermal conductivity, light weight and flexibility, and has an in-plane thermal conductivity of up to 500 W/m·K or higher, a density of 2.0 g/cm$^3$ or less, and still a thermal conductivity of 500 W/m·K or higher after the nano-carbon composite film is repeatedly bent by 180° for 50 times while there is no peeling of graphene from the surface.

The nano-carbon composite film prepared according to the present disclosure has the characteristics of high thermal conductivity, light weight and flexibility, and has very broad application prospects in the fields of satellite-borne thermally conductive parts, civil electronic components and so on.

Compared with the prior art, the present disclosure has the following beneficial effects:

In the present disclosure, a commercial graphene film is used as a high thermal conductor, with which flexibility is achieved and the problem of easy peeling off of the graphene film is overcome by means of a simple and feasible technique, so that the present disclosure can be applied in a wide scope of areas.

In the present disclosure, a carbon nanotube film/resin prepreg or a carbon nanotube/resin slurry is used as an adhesive layer, in which the carbon nanotubes can further improve the adhesion of the resin to the graphene film.

The nano-carbon film involved in the present disclosure has the characteristics of high thermal conductivity, light weight and flexibility.

The thickness of the nano-carbon film involved in the present disclosure is not limited, and can be adjusted depending on the requirement for the heat dissipation flux; and the thickness can reach 2 mm or more.

The nano-carbon film involved in the present disclosure includes a rigid section and a flexible section, the rigid section is convenient for connection with a heat source and a cold component, and the flexible section makes the connected heat source and cold component free of stress.

BRIEF DESCRIPTION OF THE DRAWINGS

Other features, objects and advantages of the present disclosure will become more apparent by reading the following detailed description of the non-limiting embodiments with reference to the following accompanying drawing:

FIG. 1 is a structural diagram of a light-weight flexible high-thermal-conductivity nano-carbon composite film according to the present disclosure, where 1-flexible adhesive layer; 2-graphene film layer; 3-flexible section; 4-rigid section.

DETAILED DESCRIPTION

The present disclosure will be described in detail below with reference to specific embodiments. The following embodiments are provided for facilitating the further understanding of the present disclosure by those skilled in the art, instead of limiting the present disclosure in any way. It should be noted that several variations and improvements can be made by those of ordinary skill in the art without departing from the concept of the present disclosure, which are all within the protection scope of the present disclosure.

The following embodiment provides a light-weight flexible high-thermal-conductivity nano-carbon composite film, which includes a plurality of composite units laminated sequentially as shown in FIG. 1. The composite unit includes flexible adhesive layers 1 and a graphene film layer 2, and the flexible adhesive layers 1 are disposed on both sides of the graphene film layer 2.

Graphene film layer 2 consists of 1-5 layers of graphene, and the thickness is 1-100 μm.

The thickness of the flexible adhesive layer 1 is 0.5-4 μm.

Flexible adhesive layer 1 includes at least one of a carbon nanotube film/resin prepreg and a carbon nanotube/resin slurry.

The resin includes one of epoxy resins, bismaleimide resins, phenolic resins, polyimides, polyethylene, polyvinyl alcohols, polyesters, polypropylene, polystyrene and polyurethane or a mixture of more than one thereof.

The content of the resin in the carbon nanotube film/resin prepreg is 20-40 wt %.

The content of the carbon nanotubes in the carbon nanotube/resin slurry is 0.02-5 wt %.

The carbon nanotube film includes tens to hundreds of layers of 100 nm-thick carbon nanotube film units, and the carbon nanotubes in the carbon nanotube film units intersect with one another to form a network structure.

The nano-carbon composite film is provided with a flexible section 3 and a rigid section 4. A gap exists between the composite units in flexible section 3, and the composite units in the rigid section 4 are closely attached to one another.

The following embodiment further provides a method for preparing the light-weight flexible high-thermal-conductivity nano-carbon composite film, which includes the following steps:

Step 1: flexible adhesive layers are prepared. In order to control the thermal conductivity and flexibility of the nano-carbon composite film, the flexible adhesive layer can be a carbon nanotube film/resin prepreg or a carbon nanotube/resin slurry. For a nano-carbon composite film with high thermal conductivity and flexibility, a carbon nanotube film/resin prepreg is used; or otherwise, a carbon nanotube/resin slurry can be used as the flexible adhesive layer.

The carbon nanotube film/resin prepreg is prepared by through a method comprising the following steps:

Step (a): dissolving a resin in a solvent to prepare a concentration of a resin solution, where the content of the resin in the solution is controlled to be 10-30% by weight; and the resin is any one of epoxy resins, bismaleimide resins, phenolic resins, polyimides, polyethylene, polyvinyl alcohols, polyesters, polypropylene, polystyrene and polyurethane; and the solvent is one of ethanol, acetone, benzene, toluene, tetrahydrofuran, dimethylformamide, methylpyrrolidone and dimethyl sulfoxide, or a mixture of two or more thereof;

Step (b): impregnating a carbon nanotube film in the resin solution for 30 minutes, where for a resin solution with a high viscosity, the impregnation time is prolonged to 1 hour, and for a volatile solvent, the impregnation process is performed in a closed vessel; and Step (c): taking out the carbon nanotube film, and drying to obtain the carbon nanotube prepreg film, where the drying temperature is lower than the gelation temperature (in case of a thermosetting resin) or the thermal decomposition temperature (in case of a thermoplastic resin) of the resin. In order to increase the volatilization rate of the solvent in the resin solution, the impregnated carbon nanotube film can be placed in a vacuum oven, and the content of the resin in the prepreg film is controlled to be in the range of 20-40 wt % by weight by adjusting the content of the resin in the resin solution.

The carbon nanotube/resin slurry is prepared by a method comprising the following steps:

Step (a): pouring carbon nanotubes into a resin, and stirring to mix the solution, where for a thermoplastic resin or a thermosetting resin that is a solid at room temperature, a solvent is introduced before stirring to lower the resin viscosity, and the resin is one of epoxy resins, bismaleimide resins, phenolic resins, polyimides, polyethylene, polyvinyl alcohols, polyesters, polypropylene, polystyrene and polyurethane, or a mixture of more than one thereof; and the solvent is one of ethanol, acetone, benzene, toluene, tetrahydrofuran, dimethylformamide, methylpyrrolidone and dimethyl sulfoxide, or a mixture of two or more thereof;

Step (b): dispersing the carbon nanotube/resin mixed solution to obtain a uniform and stable carbon nanotube dispersion, where the carbon nanotubes are one or more of single-walled carbon nanotubes, few-walled carbon nanotubes and multi-walled carbon nanotubes. The dispersing includes one or more of ultrasonic vibration, ultrasonic disruption and three-roll grinding; and Step (c): diluting the carbon nanotube film dispersion with a solvent to prepare the carbon nanotube/resin slurry, where the content of the solvent in the carbon nanotube/resin slurry is 30-80 wt % and the content of the carbon nanotubes in the carbon nanotube/resin slurry is 0.02-5 wt %.

Step 2: a flexible adhesive layer/graphene film layer/flexible adhesive layer unit is prepared. The flexible adhesive layers are introduced to both sides of the graphene film layer by laminating (the carbon nanotube film/resin prepreg) or coating (the carbon nanotube/resin slurry) to form a closely bonded unit. For a flexible adhesive layer that is a carbon nanotube film/resin prepreg, the flexibility of the unit is adjusted by changing the thickness of the carbon nanotube film, and the bonding characteristics and thermal conductivity of the unit is adjusted by changing the content of the resin. For a flexible adhesive layer that is a carbon nanotube/resin slurry, the thickness and flexibility of the adhesive layer are adjusted by changing the solvent content and the coating amount, and the bonding characteristics and thermal conductivity of the unit are adjusted by changing the content of carbon nanotubes.

Step 3: the flexible adhesive layer/graphene film layer/flexible adhesive layer units are laminated. Multiple units are sequentially laminated, a polytetrafluoroethylene film is provided between different layers at the middle section for isolation, and the different layers are closely attached to each other at the two side sections and repeatedly rolled with a pressure roller to form an integral body.

Step 4: the nano-carbon composite film is integrally formed. The laminated flexible adhesive layers and graphene film layer are heated and press formed in a vacuum bag. In order to ensure the flatness of the final product, three flat rigid balance plates are placed on the middle section and the two side sections respectively. After press forming, the polytetrafluoroethylene film between different layers at the middle section is removed to form a flexible section, and the two side sections form rigid sections after the press forming.

Embodiment 1

This embodiment provides a light-weight flexible high-thermal-conductivity nano-carbon composite film and a method for preparing same. The nano composite film is a multilayer structure including a carbon nanotube film/resin prepreg and a graphene film layer, and has a typical structure of a rigid section and a flexible section. The preparation method includes specifically the following steps.

Step 1: flexible adhesive layers are prepared. A carbon nanotube film, which is 1000 mm long, 200 mm wide and 10 μm thick, is cut by a surgical knife, where the carbon nanotube film is prepared by floating catalyst-based chemical vapor deposition. A carbon nanotube/resin prepreg is prepared by impregnation in a resin solution. AG80 resin, DDS curing agent and BF3·MEA are uniformly mixed at a weight ratio of 100:30:1 to form a resin system, and then the resin system is mixed uniformly with acetone at a weight ratio of 30:70 to form a resin solution. The carbon nanotube film is impregnated in the resin solution for 30 minutes, taken out and stood at room temperature for 2 hours to obtain the carbon nanotube film/resin prepreg, in which the content of the resin is 40% by weight.

Step 2: a flexible adhesive layer 1/graphene film layer 2/flexible adhesive layer 1 unit is prepared. The carbon nanotube film/resin prepreg is laminated on a rigid flat plate having a surface applied with a polytetrafluoroethylene film. A graphene film, which is 1000 mm long, 200 mm wide and 60 μm thick, is cut by a surgical knife, and then the carbon nanotube film is laid on the carbon nanotube film/resin prepreg. Another carbon nanotube film/resin prepreg is then laid on the graphene film and repeatedly rolled with a pressure roller, to form a closely bonded flexible adhesive layer 1/graphene film layer 2/flexible adhesive layer 1 unit.

Step 3: the flexible adhesive layer 1/graphene film layer 2/flexible adhesive layer 1 units are laminated. 20 units are sequentially laminated; a polytetrafluoroethylene film, which is 600 mm long, 300 mm wide and 10 µm thick, is provided between different layers at the middle section for isolation; the different layers are closely attached to each other at two side sections and repeatedly rolled with a pressure roller to form an integral body; and the length of the two side sections is each 200 mm.

Step 4: the nano-carbon composite film is integrally formed. The laminated layers are cured by a vacuum bag process. A specific curing scheme is as follows. The laminated layers are maintained at 90° C. for 30 minutes, then at 115° C. for 30 minutes, and at 180° C. for 3 hours. A vacuum level of −0.1 MPa is kept in the vacuum bag throughout the whole curing process. In order to ensure the flatness of the final product, three flat aluminum plates with a thickness of 0.5 mm are respectively placed on the middle section and the two side sections. After formation, the polytetrafluoroethylene film between different layers at the middle section is removed, to obtain the light-weight flexible high-thermal-conductivity nano-carbon composite film. The middle section of the nano-carbon composite film is a flexible section, and the two side sections are rigid sections with a thickness of 1.6 mm.

The in-plane thermal conductivity of the nano-carbon composite film prepared in this embodiment is 650 W/m·K; the density of the rigid section is 1.8 g/cm³; the density of the units in the flexible section is 1.9 g/cm³; and the thermal conductivity of the nano-carbon composite film is still 600 W/m·K after repeatedly being bent by 180° for 50 times while there is no peeling of graphene from the surface.

Embodiment 2

This embodiment provides a light-weight flexible high-thermal-conductivity nano-carbon composite film and a method for preparing same. The nano composite film is a multilayer structure including a carbon nanotube/resin slurry and a graphene film layer, and has a typical structure of a rigid section and a flexible section. The preparation method includes specifically the following steps.

Step 1: flexible adhesive layers are prepared. E51 resin and 2-ethyl-4-methylimidazole are uniformly mixed at a weight ratio of 100:7 to form a resin system. Multi-walled carbon nanotubes with a diameter of 20 µm are used. 1 g of the carbon nanotubes are poured into 90 g of the resin system, stirred for 30 minutes, and dispersed twice by a three-roll grinder to obtain a uniform carbon nanotube dispersion. 100 g of an acetone solution is poured into the carbon nanotube dispersion and stirred for 30 minutes to obtain a carbon nanotube/resin slurry.

Step 2: a flexible adhesive layer 1/graphene film layer 2/flexible adhesive layer 1 unit is prepared. A graphene film, which is 200 mm long, 20 mm wide and 20 µm thick, is cut by a surgical knife. The carbon nanotube/resin slurry is uniformly coated onto both sides of the graphene film by using a brush, and stood for 2 hours in a vacuum oven at a vacuum level of −0.1 MPa at 60° C., to obtain the flexible adhesive layer 1/graphene film layer 2/flexible adhesive layer 1 unit. The thickness of the flexible adhesive layer is 0.8 µm.

Step 3: the flexible adhesive layer 1/graphene film layer 2/flexible adhesive layer 1 units are laminated. 200 units are sequentially laminated; a polytetrafluoroethylene film, which is 120 mm long, 30 mm wide and 10 µm thick, is provided between different layers at the middle section for isolation; the different layers are closely attached to each other at two side sections and repeatedly rolled with a pressure roller to form an integral body, and the length of the two side sections is each 40 mm.

Step 4: the nano-carbon composite film is integrally formed. The laminated layers are cured by a vacuum bag process. A specific curing scheme is as follows. The laminated layers are maintained at 60° C. for 30 minutes, then at 80° C. for 1 hour, and at 120° C. for 3 hours. A vacuum level of −0.1 MPa is kept in the vacuum bag throughout the whole curing process. In order to ensure the flatness of the final product, three flat aluminum plates with a thickness of 1.0 mm are respectively placed on the middle section and the two side sections. After formation, the polytetrafluoroethylene film between different layers at the middle section is removed, to obtain the light-weight flexible high-thermal-conductivity nano-carbon composite film. The middle section of the nano-carbon composite film is a flexible section, and the two side sections are rigid sections with a thickness of 4.5 mm.

The in-plane thermal conductivity of the nano-carbon composite film prepared in this embodiment is 790 W/m·K; the density of the rigid section is 2.1 g/cm³; the density of the units in the flexible section is 2.1 g/cm³; and the thermal conductivity of the nano-carbon composite film is still 580 W/m·K after repeatedly being bent by 180° for 50 times while there is no peeling of graphene from the surface.

The present disclosure has many specific applications, and the above description is only preferred implementations of the present disclosure. It should be noted that the embodiments above are merely illustrative of the present disclosure and not intended to limit the protection scope of the present disclosure. Several improvements can also be made by a person of ordinary skill in the art without departing from the principle of the present disclosure, which should also be regarded as falling within the protection scope of the present disclosure.

What is claimed is:

1. A light-weight flexible high-thermal-conductivity nano-carbon composite film, comprising:
   a plurality of composite units laminated sequentially, wherein each of the plurality of composite units comprises flexible adhesive layers and a graphene film layer, and the flexible adhesive layers are disposed on both sides of the graphene film layer;
   wherein the each of the flexible adhesive layers comprises at least one of a carbon nanotube film/resin prepreg and a carbon nanotube/resin slurry; and
   the content of the resin in the carbon nanotube film/resin prepreg is 20-40 wt %.

2. The light-weight flexible high-thermal-conductivity nano-carbon composite film according to claim 1, wherein the graphene film layer consists of 1-5 layers of graphene, and the thickness of the graphene film layer is 1-100 µm.

3. The light-weight flexible high-thermal-conductivity nano-carbon composite film according to claim 1, wherein the thickness of each of the flexible adhesive layers is 0.5-4 µm.

4. The light-weight flexible high-thermal-conductivity nano-carbon composite film according to claim 1, wherein the resin comprises one of epoxy resins, bismaleimide resins, phenolic resins, polyimides, polyethylene, polyvinyl alcohols, polyesters, polypropylene, polystyrene and polyurethane, or a mixture of more than one thereof.

5. The light-weight flexible high-thermal-conductivity nano-carbon composite film according to claim 1, wherein the content of the carbon nanotubes in the carbon nanotube/resin slurry is 0.02-5 wt %.

6. The light-weight flexible high-thermal-conductivity nano-carbon composite film according to claim 4, wherein the carbon nanotube film comprises tens to hundreds of layers of 100 nm-thick carbon nanotube film units, and the carbon nanotubes in the carbon nanotube film units intersect with one another to form a network structure.

7. The light-weight flexible high-thermal-conductivity nano-carbon composite film according to claim 1, wherein the nano-carbon composite film is provided with a rigid section and a flexible section; and the composite units in the rigid section are attached to one other, and a gap exists between the composite units in the flexible section.

8. The light-weight flexible high-thermal-conductivity nano-carbon composite film according to claim 1, wherein the carbon nanotube film comprises tens to hundreds of layers of 100 nm-thick carbon nanotube film units, and the carbon nanotubes in the carbon nanotube film units intersect with one another to form a network structure.

9. A method for preparing a light-weight flexible high-thermal-conductivity nano-carbon composite film according to claim 1, comprising the following steps:

preparing flexible adhesive layers, and laminating or coating the flexible adhesive layers on both sides of a graphene film layer to form a composite unit;

sequentially laminating the composite units, and inserting a layer of polytetrafluoroethylene film between flexible sections of every two composite units for isolation; and heating and press forming the laminated composite units in a vacuum bag, and removing the polytetrafluoroethylene film after the press forming, to obtain the nano-carbon composite film.

* * * * *